R. A. McCANN.
RAILWAY SIGNALING.
APPLICATION FILED MAR. 18, 1919.
1,344,917.
Patented June 29, 1920.
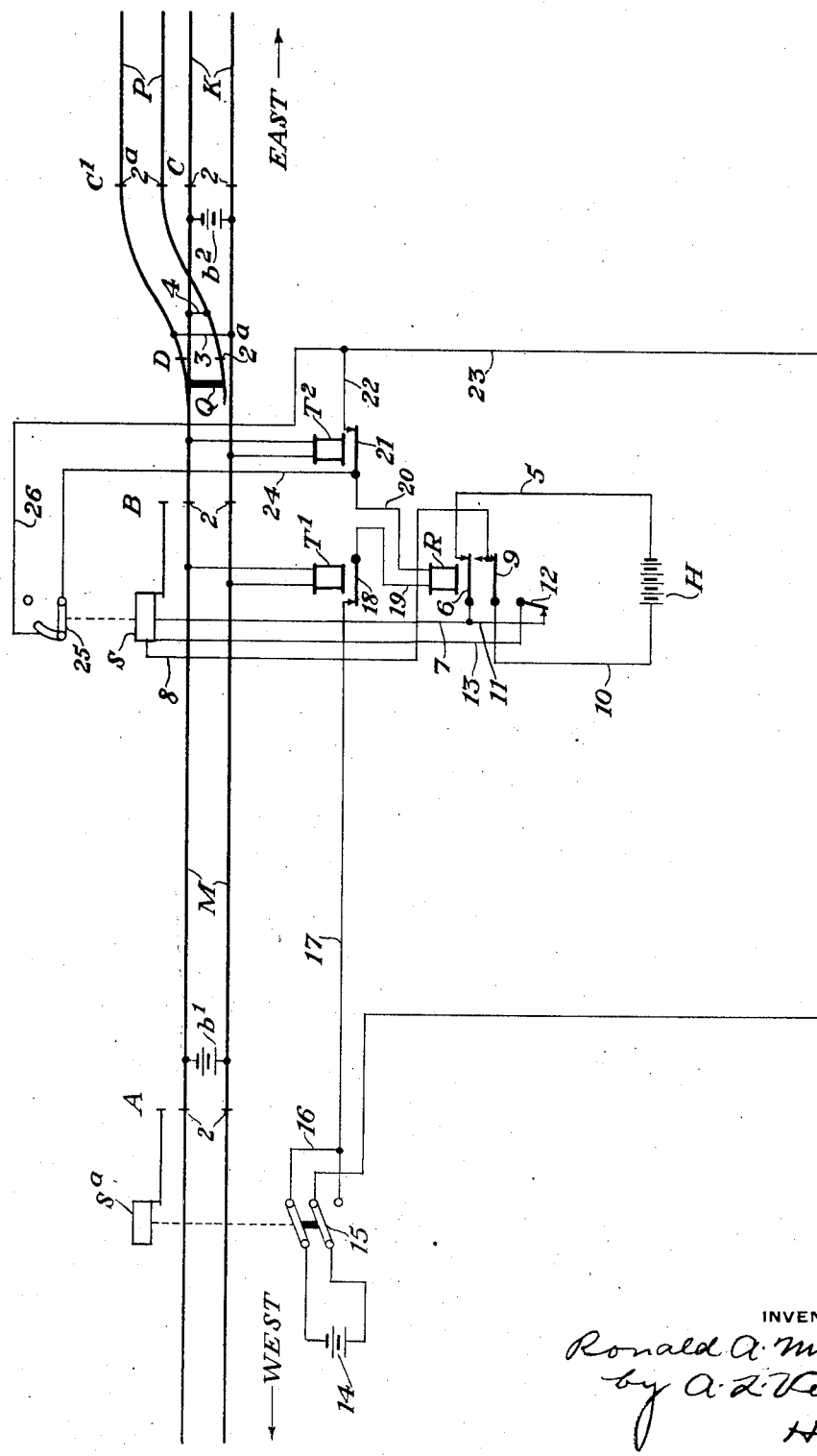
INVENTOR
Ronald A. McCann,
by A. L. Vencill
His Att'y.

UNITED STATES PATENT OFFICE.

RONALD A. McCANN, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNALING.

1,344,917. Specification of Letters Patent. Patented June 29, 1920.

Application filed March 18, 1919. Serial No. 283,407.

*To all whom it may concern:*

Be it known that I, RONALD A. McCANN, a citizen of the United States, residing at Swissvale, in the county of Allegheny and State of Pennsylvania, have invented certain new and useful Improvements in Railway Signaling, of which the following is a specification.

My invention relates to railway signaling, and particularly to signaling for the junction point of single and double tracks. More specifically, my invention relates to means for controlling a signal governing traffic into a stretch of single track from a double track.

I will describe one form of apparatus embodying my invention, and will then point out the novel features thereof in claims.

The accompanying drawing is a view showing diagrammatically one form of apparatus embodying my invention.

Referring to the drawing, the reference character M designates a stretch of single track, and the reference characters K and P designate the two tracks of a double track stretch of road, which tracks are connected with the single track stretch by a switch Q. The two tracks P and K may constitute a passing siding for a single track road, and I will for convenience refer to the track P as a side track. Traffic into the single track M from either track K or P of the double track is governed by a signal S which is located a short distance in advance of the switch Q as shown. This signal is controlled in the manner hereinafter set forth.

The single track M and track K are divided by insulated joints 2 to form two adjoining track sections A—B and B—C, which I will term the forward and rear sections respectively. Section A—B lies wholly in the single track stretch M, while section B—C includes the switch Q and the point C is at or beyond the fouling point of this switch. Section A—B is provided with a track circuit comprising the rails of the track, a source of current $b'$ and a track relay T'. Section B—C is provided with a similar track circuit comprising the rails of the section, a source of current $b^2$ and a track relay $T^2$. The portion of the side track P extending from the switch Q to the fouling point C' is electrically separated from the rails of the remainder of the side track by insulated joints $2^a$, thus forming a side track section D—C', and the two rails of this latter section are connected with the two rails of the main track section B—C in such manner that a car or train on the side track P between points D and C' will cause track relay $T^2$ to open. As here shown, the rails of section D—C' are connected in multiple with the rails of section B—C by wires 3 and 4.

The signal S is located adjacent the junction point B of the two track sections, and is controlled by a line relay R. The caution indication circuit of signal S is from a source of current H, through wire 5, front point of contact 6 of relay R, wire 7, operating mechanism of signal S, wire 8, front point of contact 9 of relay R, and wire 10 to source of current H. The clear indication circuit for this signal is from the source H, through wire 5, front point of contact 6, wire 11, polar contact 12 of relay R, wire 13, mechanism of signal S, thence through wire 8, contact 9, and wire 10 to the source H.

Line relay R is controlled by the two track relays T' and $T^2$ and also by a pole-changer 15, which latter may be operated by any suitable means, such, for example, as by a signal $S^a$ located in advance of signal S. The circuit for relay R, as here shown, is from a source of current 14, through pole-changer 15, wires 16 and 17, contact 18 of track relay T', wire 19, winding of relay R, wire 20, contact 21 of relay $T^2$, wires 22 and 23, and pole-changer 15 to the source of current 14. It will be seen that in so far as this circuit alone is concerned, relay R will be deënergized when a train occupies section A—B or section B—C, or the side track between points D and C'.

The circuit just traced for relay R is provided with a branch around contact 21 of relay $T^2$, which branch passes from wire 20, through wire 24, contact 25 and wire 26 to wire 23. Contact 25 is operated by signal S, and is closed when the signal indicates clear or caution, but open when the signal indicates stop. It will be seen, therefore, that by virtue of this branch for the circuit of relay R, if signal S is in the clear or caution position, the entrance of a west-bound train into main track section B—C or side track section D—C' will not have any effect on the indication given by signals S.

To explain the operation and purpose of the apparatus shown in the drawing, I will assume that signal S has been placed at stop by an east-bound train in section A—B, and that a west-bound train is waiting on the side track P for permission to proceed into the single track M. As the east-bound train enters section B—C it will open track relay T², and inasmuch as signal S is already in the stop position, the branch around contact 21 in the circuit of relay R will remain open until the entire train has passed the point C, which point, it will be remembered, is the fouling point for switch Q. As soon as the rear of the train has passed this point C, track relay T² will become energized, so that signal S will move to the caution or clear position. The west-bound train may then pass from siding P into the main track, but such train will not place signal S at stop until the front end of the train passes point B. That is, the deënergization of track relay T², due to the train passing point C' will have no effect on signal S because contact 25 is closed.

If the west-bound train is waiting on track K to the east of point C, the operation is substantially the same, that is, the east-bound train, when entering track P, will hold signal S in the stop position until the rear of such train passes fouling point C'.

It will be seen from the foregoing that by virtue of apparatus embodying my invention it is impossible for a train, which is waiting at a siding for another train to pass, to receive a proceed signal until the latter train has passed the fouling point of the switch leading into the siding.

Where, in the accompanying claims, I have used the term "proceed," it is understood to mean either the "clear" or the "caution" indication when the signal is capable of giving the three usual indications.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, two adjoining sections of railway track, a track circuit for each section including a track relay, a signal located adjacent the junction of said sections and governing traffic through the forward section, a line relay for control of said signal, a circuit for said line relay controlled by the track relays for both sections, and a branch for said line relay circuit around the contact of the track relay for the rear section, said branch including a contact operated by said signal and closed or open according as the signal indicates proceed or stop.

2. In combination, two adjoining sections of railway track, a track circuit including a track relay for each section, a signal located adjacent the junction of said sections and governing traffic through the forward section, a control circuit for said signal including in series a front contact of each of said track relays, and a branch for said control circuit around the contact of the relay for the rear section and including a contact which is closed or open according as said signal indicates proceed or stop.

3. In combination, two adjoining sections of railway track, a track circuit for each section, a signal located adjacent the junction of said sections and governing traffic through the forward section, means for controlling said signal by the track circuits for both sections, and means for removing said signal from control by the track circuit for the rear section when the signal indicates proceed.

4. In combination two adjoining sections of railway track, a track circuit for each section, a signal located adjacent the junction of said sections and governing traffic through the forward section, a control circuit for said signal controlled by the track circuits for both of said sections, and means controlled by the signal for removing said circuit from control by the track circuit for the rear section when the signal indicates proceed.

5. In combination, a stretch of single track, a stretch of double track connected therewith by a switch, a forward track circuit including the rails of the single track, a rear track circuit including the rails of the two tracks of the double track from the switch to the fouling point on each track, a signal located adjacent the junction of said track circuits and governing traffic through the forward track circuit, means for controlling said signal by both track circuits, and means controlled by the signal and operating when the signal indicates proceed to remove the rear track circuit from control of the signal.

6. In combination, a stretch of single track, a stretch of double track connected therewith by a switch, a forward track circuit including the rails of the single track, a rear track circuit including the rails of the two tracks of the double track from the switch to the fouling point on each track, a signal located adjacent the junction of said track circuits and governing traffic through the forward track circuit, means for controlling said signal by both track circuits, and means for removing said rear track circuit from control of the signal when the signal indicates proceed.

7. In combination, a stretch of single track, a stretch of double track connected therewith by a switch, a signal for governing traffic from the double track into the single track, and means controlled by a train entering either track of the double track from said single track for holding said signal at stop until the train passes the fouling point of said switch, said means being ineffective to cause the signal to indicate stop when a train passes from either track of the double track into the single track.

8. In combination, a stretch of single track, a stretch of double track connected therewith by a switch, a track circuit extending along said single track from a point adjacent said switch, a signal controlled by said track circuit for governing traffic from the double track into the single track, and means controlled by a train entering either track of the double track from said single track for holding said signal at stop until the train passes the fouling point of said switch, said means being ineffective to cause the signal to indicate stop when a train passes from either track of the double track into the single track.

9. In combination, a stretch of single track, a stretch of double track connected therewith by a switch, a signal located adjacent said switch for governing traffic from the double track into the single track, means controlled by a train moving along the single track toward the double track for placing said signal at stop and means for holding it at stop until the train has passed the fouling point of said switch, said last-mentioned means being ineffective to place said signal at stop when a train moves in the other direction until the train enters the single track.

10. In combination, a stretch of single track, a stretch of double track connected therewith by a switch, a signal for governing traffic from the double track into the single track, and means controlled by a train entering said double track from said single track for holding said signal at stop until the train clears the fouling point of said switch, said means being ineffective to cause the signal to indicate stop while a train moving in the other direction is within the fouling limits of said switch.

11. In combination, a stretch of single track, a stretch of double track connected therewith by a switch, a signal for governing traffic from the double track into the single track and located a short distance in advance of said switch, and means controlled by a train entering said double track from said single track for holding said signal at stop until the train clears the fouling point of the switch, said means being ineffective to cause the signal to assume the stop aspect while a train moving in the other direction is between the fouling point of said switch and the signal.

In testimony whereof I affix my signature in presence of two witnesses.

RONALD A. McCANN.

Witnesses:
   A. HERMAN WEGNER,
   E. P. CRUM.